Aug. 29, 1961     R. L. BUTZOW     2,997,876

ALL SEASON PRECIPITATION GAUGE

Filed May 27, 1960

INVENTOR.
RALPH L. BUTZOW,
BY
McMorrow, Berman & Davidson
ATTORNEYS.

United States Patent Office 2,997,876
Patented Aug. 29, 1961

2,997,876
ALL SEASON PRECIPITATION GAUGE
Ralph L. Butzow, R.F.D. 2, Box 174, Milford, Ill.
Filed May 27, 1960, Ser. No. 32,300
2 Claims. (Cl. 73—171)

This invention relates to meteorological equipment, and more particularly to a device for measuring rain fall and other types of precipitation.

A main object of the inveniton is to provide a novel and improved precipitation gauge which is simple in construction, which is reliable in operation, and which may be adapted for use under all types of weather conditions, including conditions wherein the temperatures are below freezing.

Another object of the invention is to provide a novel and improved precipitation gauge which is simple in construction, which provides accurate indications, and which may be readily set up for use to measure precipitation even under conditions where the temperature is below freezing.

A further object of the invention is to provide an improved precipitation gauge which is inexpensive to manufacture, which is durable in construction, and which is provided with a normal scale for measuring ordinary precipitation of moisture, such as rain fall, and which is further provided with an additional scale which may be employed in conjunction with the use of suitable non-evaporating anti-freeze material so that the device may be employed to measure the precipitation of snow, hail, or similar precipitation under temperature conditions which are below freezing.

Further objects and advantages of the invention will become apparent from the following description and claims, and from the accompanying drawings, wherein:

Figure 1:
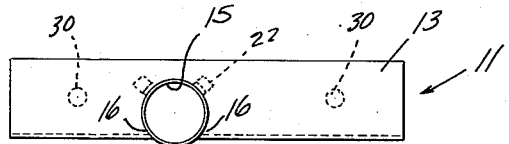
FIGURE 1 is a top view of an improved precipitation gauge device constructed in accordance with the present invention.

Referring to the drawings, 11 generally designates a precipitation gauge assembly constucted in accordance with the present invention. The assembly 11 comprises a main supporting member 12 consisting of a horizontal top flange 13 and a horizontal bottom flange 14 connected by a vertical front wall 18. The top flange 13 is formed with a generally circular notch 15 which merges at its front corners 16, 16 with a vertical slot 17 formed in the front wall 18, the vertical slot 17 extending for the full height of the front wall and terminating at the bottom flange 14.

Designated at 21 is a generally cylindrical container which is slidably receivable in the notch 15 and which is supported normally on the bottom flange 14, being retained in vertical position by the provision of a pair of upstruck retaining lugs 22, 22 formed in the bottom flange 14 and being substantially in vertical alignment with the respective side portions of the substantially circular notch 15 so as to define a receptacle or socket for the bottom end of the vertical container 21. The container 21 is open at its top end to receive rainfall or other types of precipitation.

Figure 2:
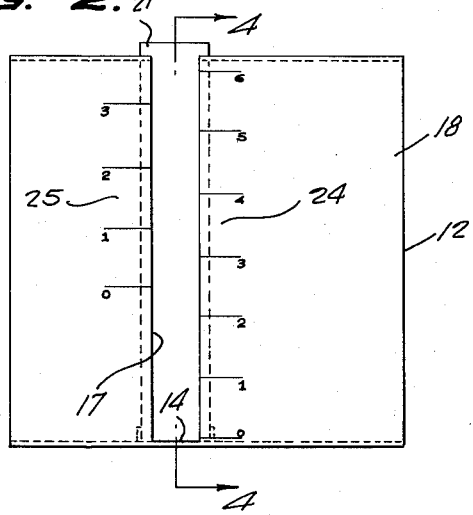
FIGURE 2 is a front elevational view of the precipitation gauge device of FIGURE 1.
Figure 3:
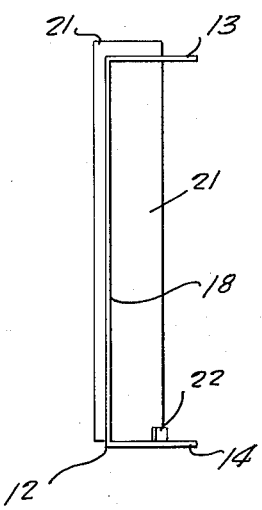
FIGURE 3 is a side elevational view of the precipitation gauge device of FIGURES 1 and 2.
Figure 4:
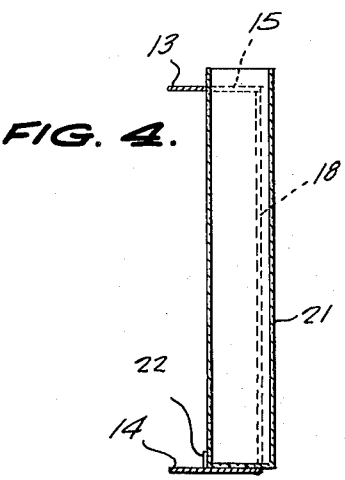
FIGURE 4 is a vertical cross sectional view taken substantially on the line 4—4 of FIGURE 2.
Figure 5:
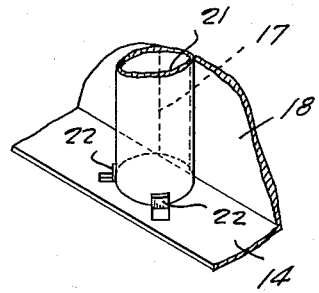
FIGURE 5 is a fragmentary perspective rear view of a portion of the precipitation gauge device of FIGURES 1 to 4, showing the upstruck retaining tabs provided to retain the precipitation container in its active position.

As shown in FIGURE 2, the forward portion of the cylindrical container 21 is exposed at the slot 17, the container being of sufficient height to extend slightly above the top flange 13 when the container is in its operating position, illsutrated in FIGURES 1 to 4. A first precipitation scale 24 is provided at one side margin of the slot 17, the scale 24 being inscribed on the surface of the wall 18 in any suitable manner, and being calibrated in inches or other acceptable units of precipitation. The zero point of the precipitation scale 24 is located at the bottom end of the vertical container 21, namely, closely adjacent to the supporting flange 14.

An additional precipitation scale 25 is inscribed at the opposite side margin of the solt 17, the additional precipitation scale 25 being intended for use in measuring precipitation under conditions wherein the temperature is below freezing, such as snow, sleet, hail, or the like. The zero point of the scale 25 is located a substantial height above the bottom flange 14, as is clearly shown in FIGURE 2, allowing the lower portion of the collecting container 21 to be filled with calcium chloride or other suitable non-evaporating anti-freeze material up to the level of the zero point of the scale 25, whereby the precipitation under freezing conditions will be converted into liquid and will collect in the container 21 to a height which may be measured by reading the scale 25. The scale 25, similar to the scale 24, may be calibrated in inches, centimeters, or any other acceptable units of precipitation.

The amount of anti-freeze material, such as calcium chloride salt, or the like, will depend upon the minimum temperatures expected in the location where the device is employed, and the scale 25 has its zero point located at a position sufficiently elevated above the bottom flange 14 so that enough anti-freeze material may be placed in the lower portion of the container 21 to accommodate the lowest temperature conditions which may be expected in the location where the device is employed.

Ordinarily, under conditions above freezing temperatures, the scale 24 will be employed to measure the direct precipitation, such as normal rainfall, or the like. However, where sub-freezing temperatures are anticipated, the container 21 may be emptied and sufficient anit-freeze material, such as calcium chloride salt, or the like, may be deposited in the container to a level corresponding to the zero point of the scale 25. The container 21 is thus prepared for the measurements of precipitation under sub-freezing conditions.

A sufficient quantity of anti-freeze materials, such as calcium chloride salt, or the like, which is relatively inexpensive, may be packaged with the precipitation device, so that it is readily available by the user for installation in the collecting container 21 when sub-freezing temperatures are anticipated.

The bottom flange 14 is provided with a plurality of apertures 30 through which suitable fasteners, such as screws, or the like, may be engaged to secure the device in an upright position on a suitable outdoor support, such as a post, tree stump, house roof, or other suitable supporting location.

While a specific embodiment of an improved precipitation gauge device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A precipitation gauge comprising a vertical wall member having horizontal top and bottom flanges, said wall member being formed with a vertical slot, said top flange being formed with a notch merging with the top end of said slot, a vertical container open at its top end, engaged through said notch and supported on said bottom flange, being exposed through said vertical slot, a first precipitation scale inscribed on the vertical wall member adjacent one side edge of the slot and having its zero point located adjacent the bottom flange, and a second precipitation scale inscribed on the vertical wall member adjacent the opposite side edge of the slot and having its zero point spaced a substantial distance above said bottom flange, whereby the lower portion of the container may be at times filled with anti-freeze material up to the level of the zero point of the second precipitation scale.

2. A precipitation gauge comprising a vertical wall member having horizontal top and bottom flanges, said wall member being formed with a vertical slot, said top flange being formed with a generally circular notch merging with the top end of said slot, a vertical container open at its top end, engaged through said notch and supported on said bottom flange, being exposed through said vertical slot, spaced upstanding retaining lugs on said bottom flange vertically aligned with said notch and engaging the bottom of the container to hold same adjacent said slot, a first precipitation scale inscribed on the vertical wall member adjacent one side edge of the slot and being adapted to measure normal precipitation, said first scale having its zero point located adjacent the bottom flange, and a second precipitation scale inscribed on the vertical wall member adjacent the opposite side edge of the slot and being adapted to measure precipitation under subfreezing conditions, said second scale having its zero point spaced a substantial distance above said bottom flange, whereby the container may be provided with anti-freeze material up to the level of the zero point of said second precipitation scale.

References Cited in the file of this patent

UNITED STATES PATENTS

| | | |
|---|---|---|
| 2,468,692 | Stevens | Apr. 26, 1949 |
| 2,513,605 | Vernon | July 4, 1950 |
| 2,628,494 | Wilson | Feb. 17, 1953 |